Figure 1:
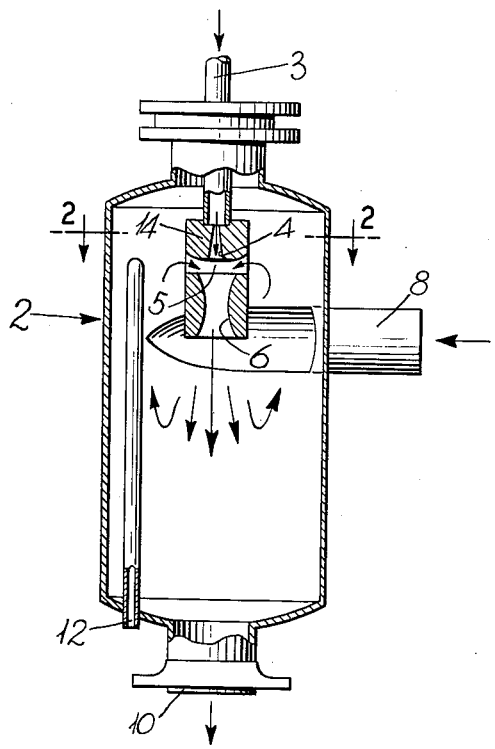

Sept. 18, 1962  R. H. SAMPLES ETAL  3,054,831
HALOGENATION OF ORGANIC COMPOUNDS OVER A NARROW TEMPERATURE RANGE
Filed April 10, 1958

INVENTORS
RANDALL H. SAMPLES
LLOYD E. HILBERT
BY George P. Maskas
ATTORNEY 3,054,831
HALOGENATION OF ORGANIC COMPOUNDS OVER A NARROW TEMPERATURE RANGE
Randall H. Samples, South Charleston, and Lloyd Ellis Hilbert, St. Albans, W. Va., assignors to Union Carbide Corporation, a corporation of New York
Filed Apr. 10, 1958, Ser. No. 727,586
7 Claims. (Cl. 260—654)

This invention relates to a novel process and reactor for conducting the halogenation of organic compounds. More specifically this invention provides both a novel process and a novel reactor whereby the temperature of halogenation reactions is easily and accurately controlled.

One of the difficulties heretofore encountered in halogenation reactions of hydrocarbons is that of temperature control. These halogenation reactions are exothermic and variations in temperature produce different products. Addition reactions between halogens and hydrocarbons such as chlorine and propylene are favored at temperatures below about 400° C. At temperatures of about 400° C. to 500° C. chlorination by substitution predominates while at still higher temperatures degradation by thermal cracking of products and reactants occur with consequent carbon formation.

One of the difficulties in maintaining a selected reaction temperature is the inability to balance the exothermic heat of the reaction against the temperature to which reactants must be heated in order to form the desired products. When the reactants are initially heated to the temperature required in the production of substituted chlorinated products the resulting heat of reaction almost immediately raises the reaction temperature to a point where carbonization results. When the reactants are precooled in an effort to offset the heat of reaction, the products first formed are chlorine addition products.

Various methods have been suggested in the past to control these exothermic reactions. One such method involves the use of efficient heat exchangers. However, this method does not permit close temperature control and it requires bulky and costly equipment. Still another method involves the use of a large excess of one of the reactants or an inert diluent to carry off the excess heat. However, the use of one of the reactants or alternatively an inert substance as a diluent to regulate the amount of reaction occurring at any given instant and also to absorb and carry off the excess heat of reaction is wasteful of heat, requires additional equipment for the separation and recovery of the diluent and in most instances the temperature control of the reaction is not satisfactory. Illustrative of the prior art methods is the use of a straight through tube for the main stream of chlorine into which hot propylene is introduced through perpendicularly opposed side arms at a mass velocity of about six times the flow of chlorine. However, the temperature control with such a process will ordinarily produce a temperature range within the reactor of about 100° C. and if the ratio of chlorine to propylene is about 1 to 1 the temperature within the reaction zone may vary by 500° C. or more.

The present improvement is based on the discovery that the reaction temperature can be easily and accurately controlled by the use of an improved reactor and a novel process wherein a stream of halogen gas projected at high velocities is fed into a reactor and into the throat of a venturi. The halogen moving at high speeds between the halogen inlet and the throat of the venturi draws into the venturi both reacted and unreacted hydrocarbons providing recycle of reactor gases and the contacting of the halogen with a mixture of both reacted and unreacted hydrocarbon in the throat of the venturi whereupon reaction occurs uniformly in the vapor phase at a rapid rate. A sufficient volume of reactor gases is recycled to prevent an excessive rise in temperature in the throat of the venturi and immediately downstream from the throat where the reaction is believed to occur. Thus it is possible to materially reduce the amount of diluent required heretofore, to utilize the heat of reaction to aid in preheating the reactants to the desired operating conditions and to control the reaction temperature narrowly, to as little as within 15° C. of selected temperature. After the reaction conditions have been stabilized, the reactor contents are a mixture of the desired reaction products and unreacted hydrocarbons all of which are continuously recycled through the venturi where more hydrocarbon and halogen react. In this process the quantities of the reactants, their ratio to each other and their temperatures are regulated through the inlet and discharge ports in such a manner as to permit the reaction temperature to be maintained at the selected value. Should the concentration of reactants momentarily exceed that required to maintain the operating temperature, the proportion of reaction products being recycled within the reactor likewise increases with a consequent dilution of the reactants which acts to reduce the temperature rise in the reaction zone. The hydrocarbon is admitted to the reactor and it is mixed with the contents of the reactor and circulated therein sufficiently to be heated to the reaction temperature prior to being drawn to the contact zone within the venturi. The hydrocarbon is intimately mixed with the reaction products within the reactor and a portion is withdrawn along with the products. Thus, it is desirable to have more than enough hydrocarbon to make up for this loss. It is believed that the close temperature control in the reaction zone is primarily due to the fact that the reactor gas containing unreacted hydrocarbon and reaction products, as they emerge from the venturi at reaction temperature, are drawn back through the throat of the venturi after being mixed with the incoming hydrocarbon feed. For instance, in Example 1, which follows, gases emerging from the venturi at 450° C. are mixed with incoming propylene at 285° C. and recycled through the venturi at an intermediate temperature of about 420° C. The net effect is therefore to maintain a reaction temperature of 435° C. ± 15° C. The relative amount of propylene and recycle gas passing through the venturi throat will depend upon the feed ratio of propylene to chlorine while preheat temperature of incoming propylene must be adjusted accordingly. The latter is determined by a heat balance under the assumption that a constant amount of total gas passes through the venturi per unit time under any given set of pressure and temperature conditions.

The halogen is fed into the reactor through a tube or jet nozzle which discharges into the throat of a venturi. The venturi tube is provided with ports or may be entirely open at its upper part so that the velocity of the halogen as it leaves the jet nozzle draws into the throat of the venturi the gases of the surrounding reactor. The jet nozzle and venturi tube may be an integral unit with openings above the venturi throat to admit the gases in the reactor or alternatively the jet nozzle and the venturi may be entirely separate. The halogen moves through both the jet nozzle and the venturi throat at a velocity so high that the reaction takes place either within the throat of the venturi or directly below the throat of the venturi. The process is best carried out with vapor velocities through the throat of the venturi greater than the flame propagation rate of the reaction. This prevents undesirable reactions from occurring between the jet nozzle and the venturi throat which is the zone where mixing is not complete. This is accomplished by providing gas velocities at the jet nozzle exit and the venturi throat of velocities greater than about 450 feet per second and preferably sonic velocities, namely speeds of greater than about 1200 feet per second. The velocity is somewhat dependent on the pressures maintained within the reactor since at higher pressures such as 6 atmospheres absolute the velocity can be decreased to about 500 feet per second and still exceed the flame propagation of the reaction.

There is a desirable relation in the dimensions of the jet nozzle diameter to the venturi throat diameter since the ratio affects both the recycle and mixing of the gases. The jet nozzle to venturi throat diameter ratio may vary from about 2 to about 20. The preferred ratio is about 8 to 12.

The reactor residence time can vary over wide limits. Slowly reacting components may require hours while fractional seconds are preferred in the reaction of chlorine and propylene to allyl chloride because a longer residence time at the reaction temperatures promotes decomposition.

The hydrocarbons contemplated in this invention are those which can be vaporized without decomposition and may be either saturated or unsaturated. Illustrative of the unsaturated hydrocarbons are those unsaturated hydrocarbons having up to about 16 carbon atoms to the molecule, including, ethylene, propylene, butene-1, butene-2, isobutylene, pentene-1, 2-methylbutene-1, 3-methylbutene-1, hexene-1, heptene-1, octene-1, decene-2, tridecene-4, cyclopropene, cyclobutene, cyclohexene, cyclooctene, acetylene, methyl acetylene, ethyl acetylene and pentyne-1. Suitable saturated hydrocarbons include methane, ethane, propane, n-butane, isobutane, n-hexane, n-heptane, 2-methylhexane, 2,4-dimethyloctane, n-dodecane, cyclopropane, cyclopentane, methylcyclopentane and the like. This invention is also applicable to halogenated hydrocarbons such as allyl chloride, vinyl chloride, allyl bromide, dichloromethane, chloroethane, dibromopropane, 1-chlorooctane and the like. Halogens such as chlorine or bromine are contemplated by the applicants.

The molar feed ratio of hydrocarbon to the halide is not narrowly critical and may vary over a wide range such as about 1 to 12 moles per mole of halogen with a preferred molar ratio of from 3 to 5 moles per mole of halogen. It is contemplated that the reactants be in the vapor state. Therefore the pressure is maintained below that which will liquify the reactants. Applicants contemplate pressures of about 0.5 to about 6 atmospheres absolute.

The reaction temperatures contemplated are those within the range of about 300° C. to 700° C. The hydrocarbon can be preheated from about 100° C. to 350° C. prior to its entry into the reactor.

Figure 2:
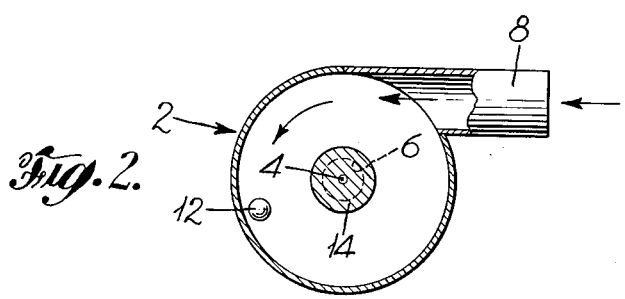

Referring now to the drawings, there is illustrated in FIGURE 1 a vertical section of a reactor. FIGURE 2 illustrates a horizontal cross section of the reactor.

The reactor 2 which is tank-shaped is equipped with a halogen feed line 3 and a high-velocity opening 4 located within the reactor near one end thereof and positioned in such a manner that it discharges directly into the throat of a venturi 6. Openings 5, communicating with the interior of the reactor, are located between the high velocity opening and the venturi throat. At about the level of the discharge end of the venturi an inlet pipe 8 is affixed to admit hydrocarbon gases. The reactor is equipped with outlet 10. A thermowell 12 with thermocouples may also provided while 14 is the venturi assembly.

Variations are possible in the above apparatus without departing from the invention. For instance, the inlet pipe for the hydrocarbon gases is shown at about the level of the venturi discharge and so positioned that the incoming hydrocarbon gases will circulate tangentially in a cylindrical reactor prior to being drawn into the venturi throat. If desired the hydrocarbon inlet may be placed in any position from the top of the reactor to a position adjacent to the reactor outlet.

In a preferred form of the invention chlorine is used to halogenate propylene at a reaction temperature of 400° C. to 450° C. to produce allylchloride. The chlorine is fed into the reactor through the jet nozzle at a pressure of 60 to 100 pounds per square inch on the upstream side of the nozzle and enters the throat of the venturi at a velocity of between 500 and 2500 feet per second and preferably about 1200 feet per second. The preferred mol feed ratio of propylene to chlorine is from 3:1 to 5:1 at a pressure within the reactor of 10 to 20 pounds per square inch. The propylene is preferably preheated to a temperature of 200° C. to 400° C. prior to its entrance into the reactor. After the reactor is operated for a short period of time the incoming propylene is mixed with the product gases in the reactor due to the turbulene within the reactor. A ratio of reactor volume to reactant flow rates is regulated so that a residence time of 0.3 to 1.5 seconds is achieved. With these operational conditions the preferred design of the reactor is one wherein the propylene is fed into a cylindrical or spherical reactor tangentially to the inner surface of the reactor and about perpendicular to the jet stream of chlorine and at about the same level as the venturi assembly. The ratio of the jet nozzle diameter to the venturi throat diameter employed is from about 1 to 8 to about 1 to 12.

The following examples are illustrative of the invention.

*Example 1*

A tank shaped reactor was employed, as illustrated in FIGURE 1. The reactor had the following dimensions:

| | Inches |
|---|---|
| (a) Volume | 110 |
| (b) Jet nozzle diameter | 0.03 |
| (c) Venturi throat diameter | 0.30 |
| (d) Length of venturi tube | 2 |
| (e) Distance between exhaust of venturi and the discharge port of reactor | 8 |
| (f) Distance between jet nozzle and venturi throat | 0.7 to 1.0 |
| (g) Distance between venturi throat and reactor outlet | 9.3 |

The chlorine was fed into the reactor through the jet nozzle and the venturi throat. The propylene was fed through a side port as is shown in FIGURES 1 and 2. The reaction conditions were as follows:

| | |
|---|---|
| Feed rate of chlorine | 9.25 lbs. per hour. |
| Feed rate of propylene | 20.6 lbs. per hour. |
| Efficiency based on conversion of chlorine to allyl chloride | 84 percent. |
| Reaction pressure | 40 p.s.i.g. |
| Preheat of proplyene | 285° C. |
| Reaction temperature | 435° C.±15° C. |
| Molar ratio of propylene to chlorine | 3.8 to 1. |

The reaction was run for eight hours during which time 10.2 pounds of a reaction product was recovered per hour of which 82.2% by weight was allyl chloride. The product was removed continuously and separated from the unreacted propylene which was recycled to the reactor through the main supply of propylene.

*Example 2*

The reactor and operating procedure used in this example was the same as that used in Example 1. The reaction conditions were as follows:

| | |
|---|---|
| Feed rate of chlorine | 4.32 lbs. per hour. |
| Feed rate of propylene | 20.9 lbs. per hours. |
| Reaction pressure | Atmospheric. |
| Reaction temperature | 502° C.±5° C. |
| Preheat of propylene | 400° C. |
| Mol ratio of propylene to chlorine | 8 to 1. |

The experiment was run for eight hours. The efficiency, based on chlorine conversion to allyl chloride was 80.5% with a production of 5.5 pounds of allyl chloride per hour.

Example 3

The same operating procedure and reactor was utilized in this example as that of Example 1. The reaction conditions were as follows:

| | |
|---|---|
| Feed rate of chlorine | 12.25 lbs. per hour. |
| Feed rate of propylene | 15.6 lbs. per hour. |
| Reaction pressure | Atmospheric. |
| Reaction temperature | 428° C.±15° C. |
| Preheat of propylene | 350° C. |
| Mol ratio of propylene to chlorine | 2.2 to 1. |

The experiment was run for ten hours. 7.2 pounds of allyl chloride were obtained per hour at an efficiency of 59.2% based on the conversion of chlorine to allyl chloride. The low efficiency to allyl chloride was caused by the low ratio of propylene to chlorine with a consequent high percentage of propylene reacted. The remainder of the chlorine reacted to form other chlorinated products.

Example 4

The same operating procedure and reactor were utilized in this example as that of Example 1. The reaction conditions were as follows:

| | |
|---|---|
| Feed rate of chlorine | 5.32 lbs. per hour. |
| Feed rate of propylene | 15.9 lbs. per hour. |
| Reaction pressure | 20 p.s.i. |
| Reaction temperature | 430° C.±15° C. |
| Preheat of propylene | 390° C. |
| Mol ratio of propylene to chlorine | 5 to 1. |
| Reaction product per hour | 4.7 lbs. of allyl chloride. |

The reaction was run for six hours during which time 4.7 pounds of allyl chloride were produced each hour at an efficiency of 83% based on conversion of chlorine to allyl chloride.

What is claimed is:

1. In a process for halogenating a vaporizable organic compound selected from the group consisting of saturated, unsaturated and halogenated hydrocarbons containing up to 16 carbon atoms within a narrow temperature range intermediate 300° C. and 700° C. wherein halogen selected from the group consisting of chlorine and bromine and the organic reactants are separately introduced in the vaporous state into a reaction chamber while simultaneously withdrawing a heated vaporous effluent composed of reactants and various product gases from said chamber the steps which comprise feeding the halogen in a stream through a jet nozzle at speeds greater than about 500 feed per second into a venturi throat and utilizing the venturi action of said halogen stream to aspirate the organic reactant and product gases through said venturi where the organic reactant is contacted and reacted with the halogen.

2. In a process for halogenating a vaporizable organic compound selected from the group consisting of saturated, unsaturated and halogenated hydrocarbons containing up to 16 carbon atoms within a narrow temperature range intermediate 400° C. and 600° C. wherein the feed mixtures of halogen and organic reactants are separately introduced in the vaporous state into a reaction chamber while simultaneously withdrawing a heated vaporous effluent composed of reactants and various product gases from said chamber, the steps which comprise feeding halogen selected from the group consisting of chlorine and bromine into the reaction chamber at sonic speeds through a jet nozzle and directly into a venturi throat, separately feeding the organic reactant into the reactor, forming a mixture of product gases and the organic reactant within the reactor, utilizing the venturi action of the halogen to aspirate the mixture of the organic reactant and product gases through the venturi throat and thus contacting and reacting the halogen with the organic reactant.

3. In a process for substitutively reacting chlorine with a vaporizable hydrocarbon selected from the group consisting of saturated, unsaturated and halogenated hydrocarbons containing up to 16 carbon atoms at temperatures of 300° C. to 700° C. wherein the feed mixtures of the chlorine and hydrocarbon are introduced in the vaporous state into a reaction chamber while simultaneously withdrawing a heated vaporous effluent composed of reactants and various product gases from said chamber and wherein the flow rate of the reactants and reaction products are such as to provide an average residence time from 0.3 second to 1.5 seconds for the gases in said reaction chamber, the steps comprising feeding the chlorine in a stream at speeds greater than about 500 feet per second through a venturi throat, conducting the hydrocarbon into the reactor and into intimate contact with the product gases whereby a mixture of organic reactant and product gases is formed, utilizing the venturi action of said chlorine stream to aspirate the mixture of hydrocarbon and product gases through said venturi throat at velocities greater than the flame propagation of the reaction whereby the major part of the reaction of the chlorine with the hydrocarbon occurs in and immediately beyond the venturi throat, and finally recovering the product gases.

4. A process for chlorinating propylene in the vapor phase to produce various product gases within a narrow temperature range intermediate about 300° C. and 700° C. which comprises separately feeding chlorine in a stream at sonic speeds through a venturi throat, separately conducting propylene to an inlet ahead of said venturi throat and in intimate contact with the product gases so as to form a mixture of propylene and product gases and utilizing the venturi action of said chlorine stream to aspirate the mixture of propylene and product gases through said venturi throat at velocities greater than the flame propagation of the reaction whereby the major part of the reaction between the chlorine and propylene occurs beyond said venturi throat.

5. A process for continuously producing allyl chloride from chlorine and propylene which has been preheated to a temperature of 200° C. to 400° C. which comprises admitting chlorine into a reactor maintained at 400° C. to 450° C., through a jet nozzle and a venturi throat at sonic velocities, conducting the propylene to an inlet ahead of the venturi throat and in intimate contact with the allyl chloride so as to form a mixture of gases and utilizing the venturi action of the chlorine to aspirate the mixture to propylene and allyl chloride through the venturi throat at speeds greater than the flame propagation of the reaction whereby the major part of the chlorine and propylene are mixed and reacted to allyl chloride in and immediately beyond said venturi throat.

6. In a process for making allyl chloride by reacting chlorine with propylene at a temperature of 400° C. to 450° C. wherein one mole of chlorine is reacted with 3 to 5 moles of propylene and wherein the reactants are fed into a reaction chamber in the vaporous state while simultaneously withdrawing a heated vaporous effluent comprising allyl chloride from said chamber and wherein the flow rate of the reactants and the vaporous effluent are such as to provide an average residence time of about 0.3 second to about 1.5 seconds in said reaction chamber the steps comprising feeding the chlorine in a thin high velocity stream of 500 to 3000 feet per second through a venturi throat, conducting propylene, said propylene being at a temperature of 200° C. to 400° C., to an inlet ahead of the venturi throat whereby the propylene forms a mixture with the allyl chloride and utilizing the venturi action of the chlorine to aspirate the mixture of propylene and allyl chloride through the venturi throat at speeds greater than the flame propagation of the reaction whereby the major part of the chlorine and propylene are mixed and reacted beyond the venturi throat.

7. Apparatus for reacting chlorine with propylene in the vaporous phase and at temperatures of 350° C. to 500° C. comprising, a cylindrical reaction chamber having a top and bottom thereto, a jet nozzle mounted within the top of said chamber for ingress of a chlorine stream at sonic speeds, said nozzle axially aligned wtih said cylindrical chamber, a venturi throat mounted on said nozzle and in axial alignment therewith and wherein the internal diameter of the venturi throat is from 8 to 12 times the internal diameter of the jet nozzle, said venturi throat having openings into said reaction chamber at the top and bottom of said throat, a first conduit mounted on the side of said reactor for ingress of propylene, said first conduit aligned to direct the propylene tangentially to the surface of the reactor and at about the level of the venturi throat, and finally said reactor having a second conduit at the bottom part thereof for egress of reaction products.

References Cited in the file of this patent

UNITED STATES PATENTS

| | | |
|---|---|---|
| 1,386,760 | Bosch | Aug. 9, 1921 |
| 1,885,012 | Harvey | Oct. 25, 1932 |
| 2,004,073 | Hass et al. | June 4, 1935 |
| 2,147,577 | Hass et al. | Feb. 14, 1939 |
| 2,301,044 | Heard et al. | Nov. 3, 1942 |
| 2,399,560 | Murphree | Apr. 30, 1946 |
| 2,643,272 | Lacomble et al. | June 23, 1953 |
| 2,763,699 | Van Dijk et al. | Sept. 18, 1956 |
| 2,806,768 | Bender et al. | Sept. 17, 1957 |
| 2,839,589 | Brown | June 17, 1958 |
| 2,848,305 | Lehrer et al. | Aug. 19, 1958 |

FOREIGN PATENTS

| | | |
|---|---|---|
| 513,947 | Great Britain | Oct. 26, 1939 |

OTHER REFERENCES

Hochst: Chlorinated Methane Derivatives B.I.O.S., Final Report No. 851, 12 pages, 3 sheets of drawing, Apr. 14, 1958.